(12) United States Patent
Sönnichsen

(10) Patent No.: US 7,329,071 B2
(45) Date of Patent: Feb. 12, 2008

(54) DEVICE FOR THE PNEUMATIC CONVEYING OF PARTICULATE AND POWDERY BULK MATERIAL

(75) Inventor: Karl-Peter Sönnichsen, Risum-Lindholm (DE)

(73) Assignee: IBAU Hamburg Ingenieurgesellschaft Industriebau mbH, Hamburg (DE)

(*) Notice: Subject to any disclaimer, the term of this patent is extended or adjusted under 35 U.S.C. 154(b) by 0 days.

(21) Appl. No.: 11/511,792

(22) Filed: Aug. 29, 2006

(65) Prior Publication Data

US 2007/0183854 A1 Aug. 9, 2007

(30) Foreign Application Priority Data

Feb. 7, 2006 (EP) ................... 06002458

(51) Int. Cl.
B65G 53/18 (2006.01)

(52) U.S. Cl. .................... 406/89; 406/144

(58) Field of Classification Search .......... 406/88, 406/89, 144; 414/676
See application file for complete search history.

(56) References Cited

U.S. PATENT DOCUMENTS

| | | | | |
|---|---|---|---|---|
| 2,272,564 A * | 2/1942 | Kuever, Jr. | .......... | 406/34 |
| 2,527,488 A * | 10/1950 | Schemm | .......... | 406/89 |
| 2,676,851 A | 4/1954 | Sylvest | .......... | 302/29 |
| 2,802,698 A * | 8/1957 | Krauss | .......... | 406/89 |
| 2,813,630 A * | 11/1957 | Morrow | .......... | 209/474 |
| 4,299,683 A * | 11/1981 | Adorno et al. | .......... | 204/246 |
| 4,411,674 A * | 10/1983 | Forgac | .......... | 55/304 |
| 4,936,715 A * | 6/1990 | Wolf et al. | .......... | 406/14 |
| 5,722,802 A * | 3/1998 | March | .......... | 406/46 |
| 5,775,851 A * | 7/1998 | Waeschle et al. | .......... | 406/14 |
| 5,884,126 A * | 3/1999 | Schoch et al. | .......... | 399/258 |
| 6,764,253 B1 * | 7/2004 | Pfeiffer | .......... | 406/11 |
| 7,144,204 B2 * | 12/2006 | Hilgraf | .......... | 406/95 |
| 7,150,585 B2 * | 12/2006 | Kleineidam et al. | .......... | 406/50 |

FOREIGN PATENT DOCUMENTS

| | | |
|---|---|---|
| CA | 1208260 | 7/1986 |
| DE | 727020 | 10/1942 |
| DE | 934696 | 11/1955 |
| DE | 967848 | 12/1957 |
| DE | 11 50 320 B | 6/1963 |
| JP | 06-154584 | 6/1994 |
| WO | EP 0243594 | 11/1987 |

OTHER PUBLICATIONS

Stoecker D. "Frischer Wind Fluidisieren Beim Schuettguthandling." Chemietechnik, Huthig, Heidelberg, DE, Bd. 28, Nr. 7, Jul. 1999; pp. 46-47, 49.

* cited by examiner

Primary Examiner—Joe Dillon, Jr.
(74) Attorney, Agent, or Firm—Roberts & Roberts, LLP

(57) ABSTRACT

Devices for the pneumatic conveying of particulate and powdery bulk goods to obtain high conveying speeds with low energy expenditure. The devices have a fluidized conveying pipe with fluidizing elements, in which pipe the fabric layers of the fluidizing elements are formed from two or a plurality of sintered and rolled metal wire fabric layers whose wires, at least those of the top outer layer, are tilted or bent downwards to form aligned flow channels inclined in the direction of conveying.

20 Claims, 4 Drawing Sheets

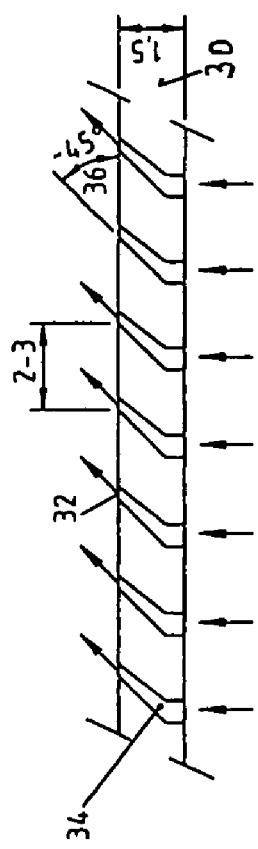
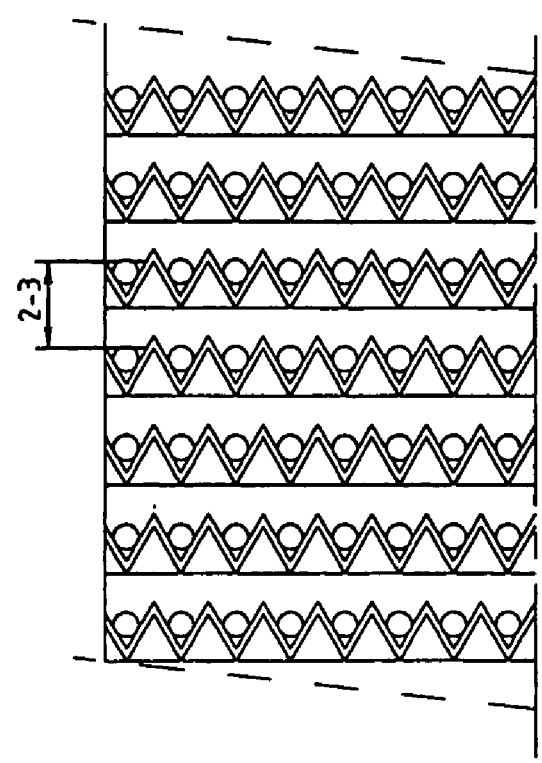
Fig. 1a
Fig. 1b

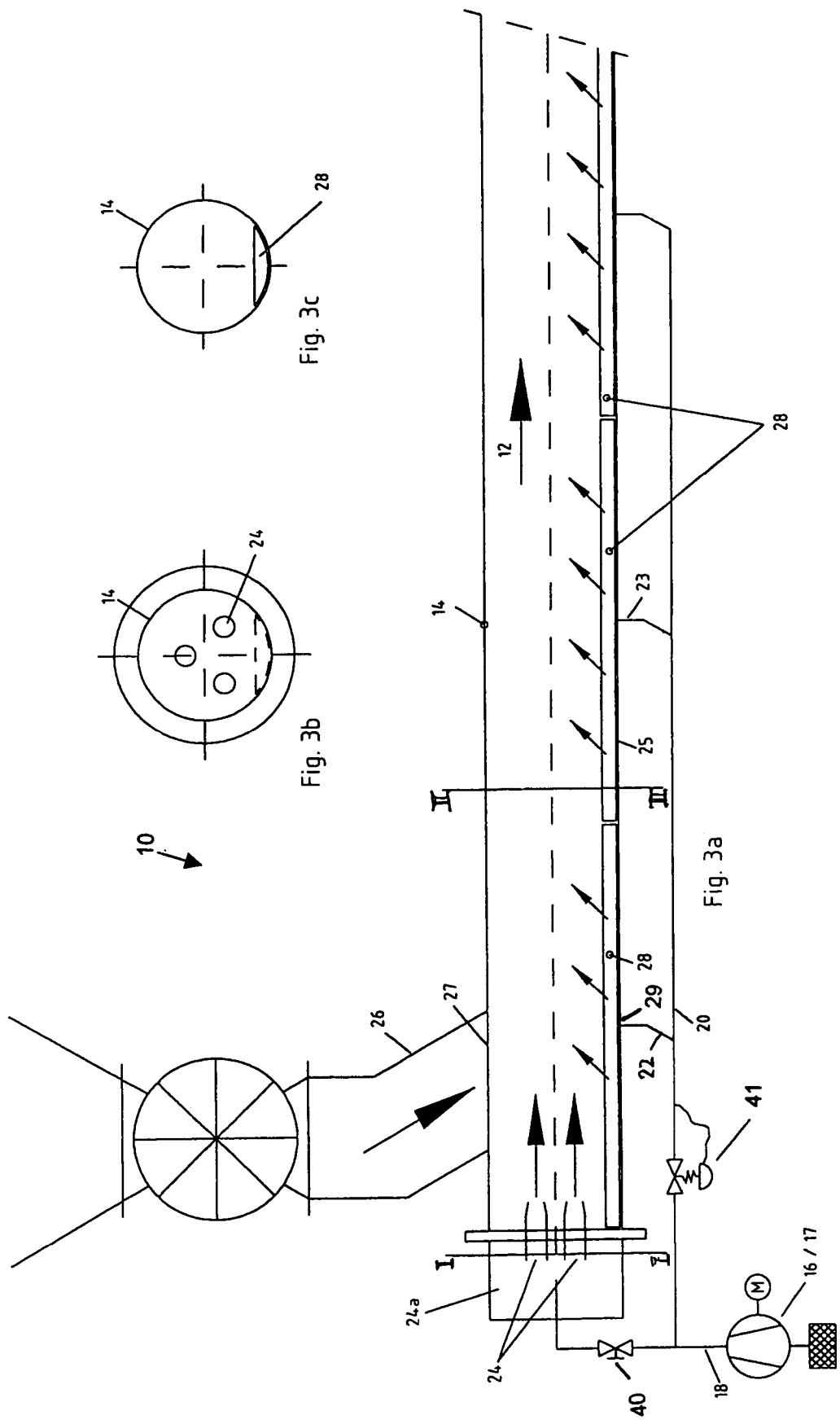

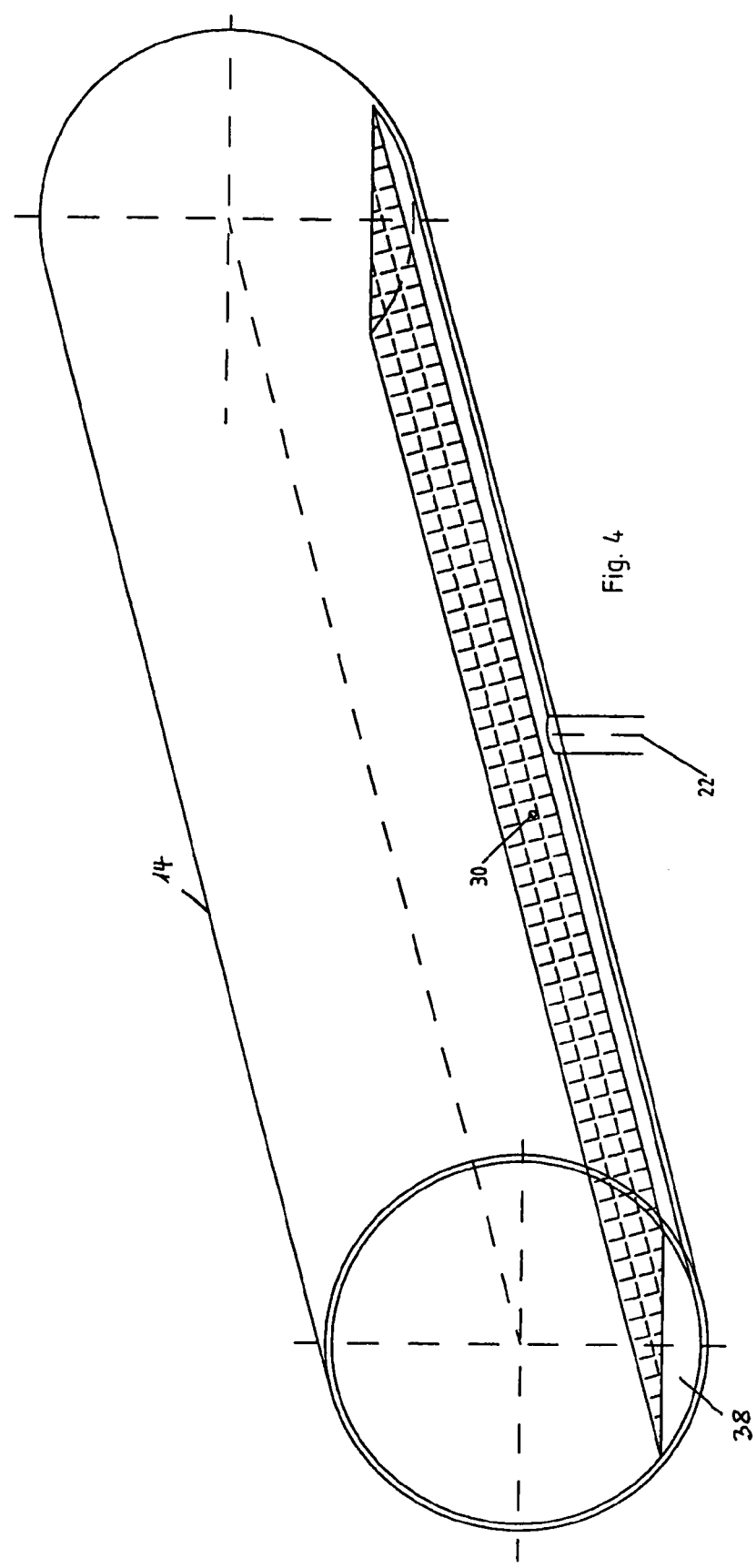

DEVICE FOR THE PNEUMATIC CONVEYING OF PARTICULATE AND POWDERY BULK MATERIAL

BACKGROUND OF THE INVENTION

1. Field of the Invention

The present invention relates to a device for the pneumatic conveying of particulate and powdery bulk goods in the horizontal, rising and/or falling direction.

2. Description of the Related Art

Different methods and devices may be used for the pneumatic conveying of particulate and powdery bulk goods such as cement, for example low energy trough conveying and flexible pipe conveying, by means of screw sluices. The disadvantage of trough conveying is the downwardly inclined conveying pipeline required, which is only possible in rare cases. Disadvantages of conveying by pipe include the generally high conveying speeds required and therefore the high outlay on energy.

What is called the fluidized conveying pipe, which can be used for both horizontal conveying and to a limited extent also vertical conveying, has also been known for some time. Here some of the air flow required for conveying is blown into the bottom of the conveying pipe by means of aeration elements in order to render the bulk goods to be conveyed flowable or to fluidize them, while the remaining, in most cases greater proportion of the air flow serves as conveying air. Understandably it is always the aim here to reduce the energy required for conveying considerably. Because of the expansion of the conveying gas over the conveying length the gas flow rates increase so that a conventional non-fluidized conveying pipe is able to connect to a fluidized conveying pipe.

The problem with the fluidized conveying pipe is the method of fluidization and feeding of the conveying and fluidizing air, which is also termed fluid gas. Synthetic fabric, with thicknesses of approx. 4-5 mm and pressure losses of approx. 0.01 bar, is normally used for the fluidization, conventionally with specific fluidizing flow rates of 0.25 $m^3/m^2$*min (cubic meter per square meter per minute) to 1.0 $m^3/m^2$*min. The flow rates through the fluidizing fabric are determined from the free cross-section and are of the order of 0.1-0.3 m/s. This is a power of ten below the suspension rate of powdery goods such as cement, which is approximately 2 m/s. On the one hand the flow rate through the fluidizing fabric does not have sufficient energy to fluidize the goods to be conveyed fully at the top, and on the other hand the flow is undirected and no pulse is transferred to the bulk goods in the direction of conveying.

Furthermore, the distribution of the fluidizing air underneath the fluidizing fabric is important. On the one hand an excess pressure, relative to the pressure in the conveying pipe, must exist underneath the fluidizing fabric so that the flow does not recoil and very fine particles penetrate the fluidizing fabric, and on the other hand it must be ensured, by expensive air flow control and air flow throttling, that if there are a plurality of pipe sections the air is also fed from the generating fan or compressor into the first segment at the beginning of the conveying pipe line and does not flow out of the conveying pipe line on an element further behind in the direction of conveying with a lower counter pressure. Such air flow throttling is always associated with an appreciable energy loss. If the air flow throttling is to be avoided individual fans with staged pressures must be used in practice for each aerating element, but this is too expensive and is not practical.

The object of the invention is therefore to eliminate the problems described and improve the known device already mentioned so that it operates at a low energy level but nevertheless enables the conveyed, fluidized bulk goods to be accelerated. A further object of the invention is to provide as complete fluidization as possible that is uniform or controllable over the conveying distance.

Instead of the known synthetic fabric and the associated disadvantages, fluidizing elements are proposed according to the invention which, because of their design features, have excellent properties for fluidized conveying pipes. The fabric of the fluidizing elements consists of a plurality of sintered and rolled metal wire fabric layers, 3-7, or 5 layers of which are advantageously provided, the top layer of which has flow channels directed by rolling. Therefore the fluidization then takes place by means of fluidizing elements which transmit a pulse to the goods to be conveyed in the direction of conveying due to inclined flow channels and supply conveying speeds which exceed the suspension rate.

The individual layers are joined together by a sintering process under the influence of pressure and temperature. The thickness of such a multilayer fabric may be approximately 2 mm after joining.

The metal fluidizing elements are advantageously only approx. 1.0-1.5 mm, in particular 1.2 mm thick, but form (micro)flow channels which are advantageously inclined approximately 45° on the upper side in the direction of conveying. The free cross section of the flow channels may be reduced until flow rates of 2-10 m/s are obtained, with corresponding pressure loses of 0.05-0.5 bar. At such flow rates a pulse is transmitted to the goods to be conveyed on the fluidizing fabric via the fluidizing air in the direction of flow, and the goods to be conveyed are accelerated, which has a favorable effect on the conveying process from the point of view of energy. On the other hand, throttling of the conveying air and the associated energy loss can be almost completely eliminated by using fluidizing fabrics with different and increasing pressure losses in the direction of conveying because the energy is converted to kinetic energy for conveying.

The sum of all the flow channel cross sections related to a surface area is defined as the free flow cross section. In the case of the metal wire fabric this is approximately 0.1-0.2%, i.e. the flow rate in the free flow cross section is increased to 4.15 to 8.3 m/s from an inflow of 0.5 m3/m2*min. or 0.0083 m/s. By reducing the metal wire fabric thickness after rolling, the flow cross sections are also reduced and the flow rates are correspondingly increased. The flow channel cross section of the "microchannels" varies with the different wire thicknesses and mesh widths through the fabric layers with the pore sizes of 5 to 100 μm according to the invention.

A defined height is required for rolling, thus a roll pressure of approx. 1 KN is sufficient, for example. The height also depends on the desired parameters (air permeability, flow rate and flow channel direction), according to the number of fabric layers, thickness, mesh width, etc.

The acceleration of the goods to be conveyed is a function based on the proportion from the conveying air and the proportion from the fabric flow along the conveying distance, wherein the goods to be conveyed can be accelerated from zero at the beginning of the conveying pipe line to approx. 5 m/s at the end of the conveying pipe line. The flow through the fabric is decisive for fluidization. It may be assumed here that with flow rates of 5-10 m/s after the fabric, the fluidizing air transmits to the goods to be conveyed a flow pulse which otherwise can only be transmitted via the conveying air. Since the conveying air tends to penetrate beyond the goods located on the pipe bottom, and because about 20-30% of the energy is unused here, up to half this energy loss can be avoided with the so-called "pulse fluidization".

The fluidizing elements can also be constructed as aeration cushions which can be installed in conveying pipes, the air connection being sufficient to secure them. The fluidizing fabric of the fluidizing elements can advantageously be provided with a radius so that the pipe cross section of the conveying pipe is obstructed as little as possible, and an improved transition to bends and the like is achieved in the conveying pipe line. A general structure with a fluidized conveying pipe, consisting of a plurality of horizontal sections, and a conventional conveying pipe connected to them, which also incorporates a vertical section, is therefore possible, in which case air nozzles for the conveying gas may also be used to achieve an acceleration of the goods to be conveyed at the beginning of the conveying pipe line. To obtain an optimized design, in terms of energy, the acceleration effects of the nozzles are combined with those of the fluidizing fabric.

A preferred exemplary embodiment of the device according to the invention is explained in further detail in the following with reference to the drawing, which should be used for a clearer understanding of the invention, but is not restricted to the same.

SUMMARY OF THE INVENTION

The invention provides a device for the pneumatic conveying of particulate and powdery bulk goods in the horizontal, rising and/or falling direction, comprising:

a. a conveying pipe, b. a fluid gas source which is connected to the conveying pipe via pipelines, c1. fluid gas feed devices on a front side of the conveying pipe for feeding fluid gas in the direction of conveying, c2. fluid gas feed devices on a bottom of the conveying pipe, d. fluidizing elements in the conveying pipe in the form of fabric layers through which fluid gas flows from the bottom of the conveying pipe, e. bulk goods feed devices having a supply pipe which opens in an upper side of the conveying pipe;

wherein the fabric layers of the fluidizing elements are formed from two or more sintered and rolled metal wire fabric layers whose wires, at least those of the top outer layer, are tilted or bent downwards to form aligned flow channels inclined in the direction of conveying.

BRIEF DESCRIPTION OF THE DRAWINGS

FIG. 1a shows a diagrammatic cross-sectional cut-out view of the metal wire fabric layers used according to the invention, with flow channels aligned in the direction of flow;

FIG. 1b shows a diagrammatic sectional view of the metal wire fabric with the microflow channels;

FIG. 2b shows a cross-sectional view through the lower box with metal wire layers shown in FIG. 2a;

FIG. 3a shows a diagrammatic representation of the device according to the invention, in cross section;

FIG. 3b shows a section along line I-I in FIG. 3a through the nozzle arrangement used;

FIG. 3c shows a section along line II-II in FIG. 3a through the conveying pipe with the lower box and fluidizing element; and FIG. 4 shows a diagrammatic cut-out perspective view similar to FIG. 2a, with conveying pipe indicated.

DETAILED DESCRIPTION OF THE INVENTION

Figure 2A:
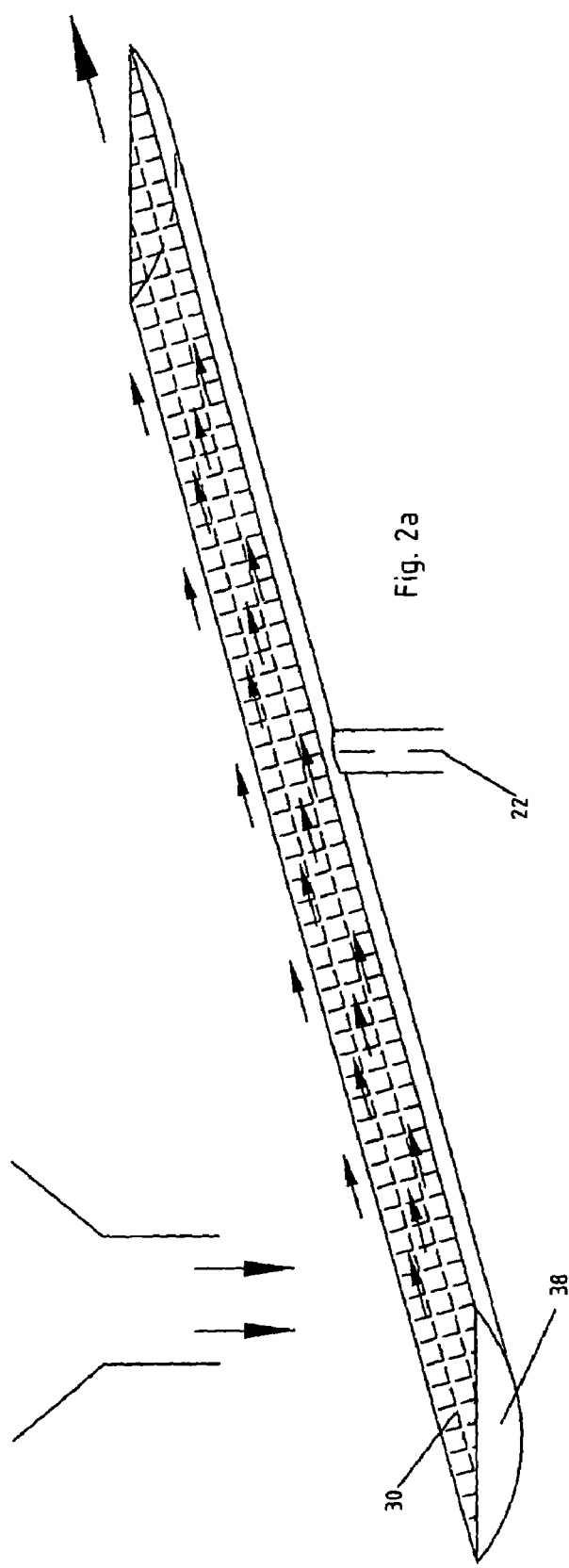
FIG. 2a shows a diagrammatic perspective view of the closed lower box with the metal wire fabric layers, omitting the conveying pipe.

In FIG. 1a the metal wire fabric according to the invention is generally denoted by 30, and is shown in a rough diagrammatic form only. It consists of five layers which are connected rigidly together by sintering. The thickness of these layers pressed together is then approx. 2.0 mm. The metal wires of the uppermost layer, or even of the top two layers, are bent downwards by subsequent rolling (the thickness of the layers is now only approx. 1.2 mm), so that it forms an angle of approx. 45° to the horizontal direction of conveying 12. The wire thickness of fabric 30 is 0.6 mm with a mesh width of 100 µm. So-called microflow channels, whose pore size is 50 µm for fluid gas outlet opening 32, are denoted by reference number 34. However, other values are easily conceivable to the person skilled in the art. Reference numeral 36 indicates the inclination of the flow channels.

FIG. 1b shows an enlarged representation of the surface of metal wire fabric 30, in which microflow channels 34 run a distance of approximately 2-3 mm from each other for the aligned fluid gas outlet. Here too, however, other values are conceivable.

Figure 2C:
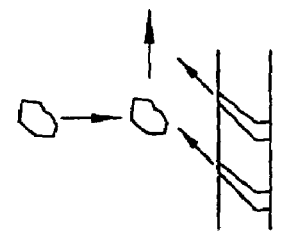
FIG. 2c shows a cross-sectional view to show the directional acceleration the powdery particles take.
Figure 2B:
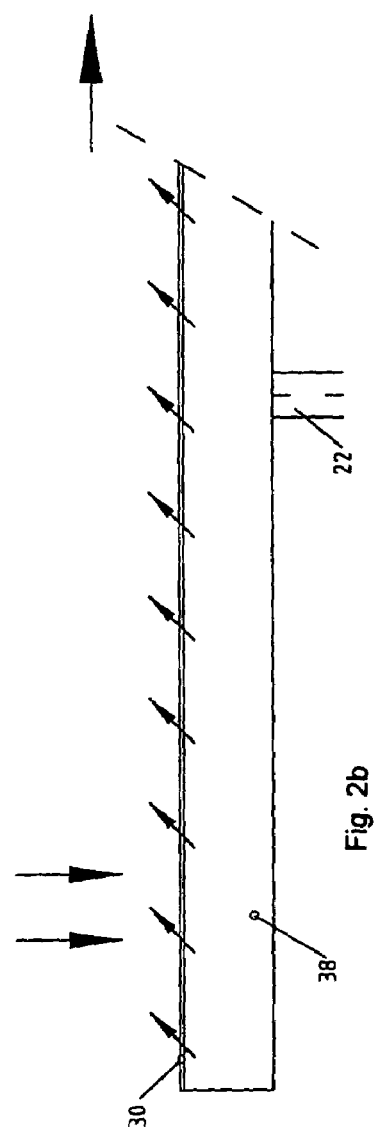

The diagrammatic representations in FIGS. 2a, 2b and 2c are intended to explain clearly how the directional acceleration of the powdery particles takes place by means of the metal wire fabric designed according to the invention.

In the exemplary embodiment shown in FIGS. 3a, 3b and 3c, a pneumatic conveying device 10 is represented for conveying fine-grained, powdery bulk goods. It consists of an elongated fluidized conveying pipe 14, which is constructed from a plurality of sections with aerating elements 28. A conventional conveying pipe 39, without fluidization, connects to fluidized conveying pipe 14, which conveying pipe may run horizontally or vertically. The bulk feed takes place through suitable feed devices 26, such as bucket wheels and rotor balances on upper side 27 of the conveying pipe.

The air flow for conveying and fluidization is provided by a fan 16 or compressor 17 and is fed through throttle valves 40 and air flow regulators 41 to a nozzle chamber 24a at the beginning of the conveying pipe line and to fluidization gas feed devices 22, 23, 24 on conveying pipe bottom 25. Aerating elements 28, whose flow resistance increases in the direction of conveying, are used to distribute the air flow on the bottom of the conveying pipe, thereby enabling throttle devices to be dispensed with in the fluidization. As a result of the high air flow rates achieved after the escape from the aerating elements, the goods to be conveyed on the floor of the pipe receive a flow pulse and are accelerated. Nozzles 24 of nozzle chambers 24a and aerating elements 28 interact to accelerate the goods to be conveyed.

The fluidizing or aerating element shown in FIG. 4 consists of metal wire fabric layers 30 sintered and rolled according to the invention, a lower box 38 for the fluidizing air and an air connection socket. The elements are prefabricated in certain pipe lengths. The size of the element and the lower boxes 38 is adapted to the contour of conveying pipe 14. About 5 different values of inside pipe diameter, from 100 mm to 300 mm, may generally be chosen. Elements 28 are screw-connected by air connection socket 29 to pipe 14, and sealed by means of a suitable collar or the like.

For a particular pipe size, aerating elements 28 are manufactured with different pressure stages from 0.05 bar to approx. 0.5 bar. This graduation may be in steps of 0.05 or 0.1 bar, for example. Elements 28 with higher pressure losses give rise to higher fluidizing air flow rates and vice versa. In the case of elements 28 with the higher pressure losses, either the roll pressures have been increased and the flow cross sections therefore reduced, or metal wire fabric layers 30 with smaller mesh widths or smaller wire thicknesses have been used.

What is claimed is:

1. A device for the pneumatic conveying of particulate and powdery bulk goods in the horizontal, rising and/or falling direction, comprising:
   a. a conveying pipe,
   b. a fluid gas source which is connected to the conveying pipe via pipelines,
   c1. fluid gas feed devices on a front side of the conveying pipe for feeding fluid gas in the direction of conveying,
   c2. fluid gas feed devices on a bottom of the conveying pipe,
   d. fluidizing elements in the conveying pipe in the form of fabric layers through which fluid gas flows from the bottom of the conveying pipe,
   e. bulk goods feed devices having a supply pipe which opens in an upper side of the conveying pipe;
   wherein
   the fabric layers of the fluidizing elements are formed from two or more sintered and rolled metal wire fabric layers whose wires, at least those of the top outer layer, are tilted or bent downwards to form aligned flow channels inclined in the direction of conveying.

2. The device as claimed in claim 1, wherein the metal wire fabric layers) have wire thicknesses of 0.1 to 1.0 mm and mesh widths of 20-150 μm, and wherein the flow channels have pore sizes for fluid gas outlet having openings of 5 to 100 μm, wherein the thickness of the sintered and rolled metal wire fabric layers ranges from 0.5 to 5.0 mm.

3. The device as claimed in claim 1, wherein an innermost metal wire fabric layer has the smallest mesh width and wire thickness, an outermost metal wire fabric layer has the largest mesh width and wire thickness, and the thickness of the sintered and rolled metal wire fabric layers range from 1.2 to 1.5 mm.

4. The device as claimed in claim 1, wherein the flow channels on the upper side are inclined 40-50° in the direction of conveying.

5. The device as claimed in claim 1, wherein the flow channels have a free cross section of between 0.05 and 0.2% of the inflow area so that flow rates of 2-10 m/s are obtained.

6. The device as claimed in claim 1 wherein the flow channels are a distance of 1-3 mm from each other.

7. The device as claimed in claim 1 wherein the fluidizing elements are arranged in staggered fashion in the direction of conveying with higher pressure losses and flow rates.

8. The device as claimed in claim 1 wherein the sintered and rolled metal wire fabric layers form the upper side of a lower box with a fluid gas feed, which box is secured inside the conveying pipe on its bottom and is arc-shaped in cross section.

9. The device as claimed in claim 1 wherein the metal wire fabric layers are flat or arc-shaped in cross section.

10. The device as claimed in claim 1 wherein the fluid pipe has one or a plurality of fluidizing and/or non-fluidizing sections.

11. The device as claimed in claim 10 which comprises fluidizing sections and wherein the fluidizing sections are arranged underneath the bulk goods feed devices and are adjacent to each other, the last of these sections adjoining a non-fluidizing pipe section in the direction of conveying.

12. The device as claimed in claim 2 wherein the flow channels are a distance of 1-3 mm from each other.

13. The device as claimed in claim 3 wherein the flow channels are a distance of 1-3 mm from each other.

14. The device as claimed in claim 4 wherein the flow channels are a distance of 1-3 mm from each other.

15. The device as claimed in claim 5 wherein the flow channels are a distance of 1-3 mm from each other.

16. The device as claimed in claim 2 wherein the fluidizing elements are arranged in staggered fashion in the direction of conveying with higher pressure losses and flow rates.

17. The device as claimed in claim 3 wherein the fluidizing elements are arranged in staggered fashion in the direction of conveying with higher pressure losses and flow rates.

18. The device as claimed in claim 4 wherein the fluidizing elements are arranged in staggered fashion in the direction of conveying with higher pressure losses and flow rates.

19. The device as claimed in claim 5 wherein the fluidizing elements are arranged in staggered fashion in the direction of conveying with higher pressure losses and flow rates.

20. The device as claimed in claim 6 wherein the fluidizing elements are arranged in staggered fashion in the direction of conveying with higher pressure losses and flow rates.

* * * * *